United States Patent
Proidl

(10) Patent No.: US 7,352,672 B2
(45) Date of Patent: Apr. 1, 2008

(54) DEVICE FOR AND METHOD OF DETERMINING THE QUALITY OF A DATA SIGNAL

(75) Inventor: Adolf Proidl, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 695 days.

(21) Appl. No.: 10/232,737

(22) Filed: Aug. 29, 2002

(65) Prior Publication Data

US 2003/0043896 A1     Mar. 6, 2003

(30) Foreign Application Priority Data

Aug. 31, 2001   (EP)   ................... 01890256

(51) Int. Cl.
*G11B 7/00*   (2006.01)
(52) U.S. Cl. ................ 369/53.31; 369/53.15; 375/224
(58) Field of Classification Search .............. 369/53.31
See application file for complete search history.

(56) References Cited

U.S. PATENT DOCUMENTS

| | | | |
|---|---|---|---|
| 4,958,337 A | 9/1990 | Yamanaka et al. ............ 369/58 |
| 5,438,692 A * | 8/1995 | Mohindra .................... 455/324 |
| 2003/0161245 A1 * | 8/2003 | Henrichs ..................... 369/95 |

FOREIGN PATENT DOCUMENTS

| | | |
|---|---|---|
| EP | 0559277 A1 | 9/1993 |
| EP | 1204233 A1 | 8/2002 |
| WO | WO0141140 | 7/2001 |

* cited by examiner

*Primary Examiner*—Wayne Young
*Assistant Examiner*—Van T. Pham

(57) ABSTRACT

In the case of determination means (10) for determining the quality of a data signal (DS), which data signal (DS) consists of data blocks, wherein each data block is at least two-dimensional in structure and comprises at least two data zones, there are provided validity assessment means (7) for assessing whether data zones of at least one data block are valid or invalid and for generating and outputting validity information (QI) representing the assessment result and validity information processing means (9), which are designed to determine the quality of the data signal (DS) on the basis of the validity information (QI).

12 Claims, 1 Drawing Sheet

DEVICE FOR AND METHOD OF DETERMINING THE QUALITY OF A DATA SIGNAL

The invention relates to determination means for determining the quality of a data signal, which data signal consists of data blocks, wherein each data block is at least two-dimensional in structure and comprises at least two data zones, which determination means comprise validity assessment means, which are designed to assess whether data zones of at least one data block are valid or invalid, and to generate and output validity information representing the assessment result.

The invention also relates to a determination method for determining the quality of a data signal, which data signal consists of data blocks, wherein each data block is at least two-dimensional in structure and comprises at least two data zones, which determination method exhibits the steps listed below, namely:

assessing whether data zones of at least one data block are valid or invalid, and generating and outputting validity information representing the assessment result.

The invention further relates to a data processing device for processing a data signal having determination means for determining the quality of a data signal, which data signal consists of data blocks, wherein each data block is at least two-dimensional in structure and comprises at least two data zones, which determination means comprise validity assessment means, which are designed to assess whether data zones of at least one data block are valid or invalid, and to generate and output validity information representing the assessment result.

Such determination means of the type described above in the first paragraph and such a determination method of the type described above in the second paragraph and such a data processing device of the type described above in the third paragraph are known from patent document EP 0 559 277 A1.

The known data processing device is designed as a read/write device for writing recording data to a Compact Disk, wherein writing of the recording data is performed in the form of data parts and wherein, after each data part is written, each data part is check-read. The data processing device comprises the known determination means, by means of which the known determination method may be performed, such that, on the basis of each check-read data part, which is represented by means of a data signal, the quality of this data signal may be determined and consequently the quality of the recorded data part may also be assessed. To this end, the determination means are designed to detect errors in the data signal and to count the detected errors in accordance with a criterion, wherein a count result is output by the count means to indicate the quality of the data signal and used in the data processing device to optimize parameters influencing writing of the recording data, such that re-writing of the respective data part with optimized parameters may optionally be performed. As criterion there is disclosed, for example in conjunction with an error correction code contained in the data signal, a block error rate which indicates as a statistic how many data blocks contained in the data signal exhibit errors. A further criterion disclosed is that the number of errors per data part must not exceed a threshold value. The problem with the known data processing device and the known determination means and the known determination method is that, when the quality of the data signal is determined, only the check-read data part is assessed because, as a consequence of quality determination, the data processing device has to decide whether or not the data part needs to be rewritten to the Compact Disk. Therefore, in the present case no reliable statement about the overall quality of the recording data is possible, as is required in uninterrupted manner during processing of the data signal in the case of real time data processing of a data signal representing the entire recording data.

It is an object of the invention to eliminate the above-listed problems associated with determination means of the type described above in the first paragraph and a determination method of the type described above in the second paragraph and a data processing device of the type described above in the third paragraph and to provide improved determination means and an improved determination method and an improved data processing device.

To achieve the above-described object with regard to determination means of the type described above in the first paragraph, provision is made according to the invention for validity information processing means to be provided which are designed to determine the quality of the data signal on the basis of the validity information.

To achieve the above-mentioned object, features according to the invention are provided for a determination method of the type described above in the second paragraph, such that such a method may be characterized in the following way, namely:

A determination method for determining the quality of a data signal, which data signal consists of data blocks, wherein each data block is at least two-dimensional in structure and comprises at least two data zones, which determination method exhibits the steps listed below, namely:

assessing whether data zones of at least one data block are valid or invalid, and generating and outputting validity information representing the assessment result, characterized in that the quality of the data signal is determined on the basis of the validity information.

To achieve the above-described object with regard to a data processing device of the type described above in the third paragraph, provision is made according to the invention for validity information processing means to be provided which are designed to determine the quality of the data signal on the basis of the validity information.

By providing the measures according to the invention, it is advantageously ensured that the quality of a data signal consisting of a plurality of data blocks, for example of overall recording information recorded on a data storage medium and constituting the data signal or overall transmission information to be transmitted and constituting the data signal, may be established solely on the basis of the assessment of whether data zones of at least one data block are valid or invalid. Accordingly, the quality of the overall data signal may be reliably determined on the basis of the assessment of data zones of a single data block of the data signal. The advantage is further achieved that the quality of such a data signal may be established in real time, i.e. virtually at the times at which the validity of the data zones is assessed. This is particularly advantageous if the data signal is processed in real time, for example if time-delayed repeated check reading of recording information from a data storage medium or re-transmission of transmission information is impossible without undesirable interruption of real time processing, because this would lead, for example, to acoustic interruptions in an audio transmission or to "frozen" image contents in the case of an image transmission. The advantage is further achieved that, on the basis of the established quality of the data signal, conclusions may be drawn as to the suitability of a data storage medium for storage, i.e. continuing reliable retention, of a data signal or as to the suitability of a transmission link for transmitting a data signal, such that an interruption of real time processing, which would be particularly critical for real time data processing of a data signal and generally unacceptable, or even an irreparable total loss of the data signal may be reliably prevented.

In the case of the invention, the quality of a data signal may be determined on the basis of a statistical evaluation of the validity information, which however is virtually always associated with time expenditure for the statistical evaluation, because this can only ever be performed in time-delayed manner, and which is therefore only unproblematic in the case of time-uncritical processing of the data signal. Moreover, determination of the quality of a data signal may be performed on the basis of an absolute value determinable by means of the validity information, which absolute value indicates for example the number of valid data zones of at least one data packet. However, it has proven particularly advantageous for the validity information processing means to be designed to determine the quality of the data signal on the basis of the number, determinable by means of the validity information, of invalid data zones of at least one data block. In this way, the advantage is achieved that the quality of the data signal may actually be established without undesirable delays, i.e. in real time, because the number of invalid data zones in comparison with the number of valid data zones is virtually always dominant in determining the quality of a data signal.

In the case of the invention, it has additionally proven advantageous for the validity information processing means to be designed to determine the quality of the data signal in relation to a limit value of invalid data zones of at least one data block. In this way, the advantage is achieved that the quality of a data signal may be established unambiguously in relation to a limit value of invalid data zones of at least one data block and is not open to any desired definition. In this context, it has proven particularly advantageous for the limit value of invalid data zones of at least one data block to be defined by an error correction coding provided in each data block, because determination of the quality of a data signal is thereby actually geared, for interruption-free real time data processing, to the maximum limit value of invalid data zones of at least one data block technically possible for the respective data signal, since it is technically ensured up to this limit value that no signal loss occurs, which is of decisive significance with regard to real time data processing especially in the event of establishing the quality of a data signal.

In the case of the invention, it has additionally proven advantageous for the validity information processing means to be designed to output a quality indicating signal representing the determined quality of the data signal. In this way, the advantage is achieved that the determined quality of a data signal is as readily as possible available. The quality indicating signal may consist of an electrical signal, for example, whereby the advantage is achieved that this electrical signal is available and directly usable for further processing, such as for example for control purposes. In this context, it has proven particularly advantageous for the determined quality to be output in the form of an acoustic or optical signal representing the quality indicating signal. In this way, the decisive advantage is achieved that the quality of a data signal and thus also the suitability of a transmission link for the transmission of a data signal or the suitability of a data storage medium for storage, i.e. for continuing reliable retention, of a data signal may be communicated unambiguously to the user. In connection with the optical signal, it has additionally proven particularly advantageous for the optical signal to be displayed in scalar manner. In this way, the decisive advantage is achieved, in addition to unambiguous communication of the suitability of a data storage medium or a transmission link, that a measure of the interference in the transmission link or a measure of the wear or contamination of or damage to the data storage medium may also be communicated to the user, because these age- or production- or use-determined influences on a data storage medium or these troublesome influences in a transmission link in particular constitute a decisive criterion with regard to suitability for use in real time data processing. On the basis of the quality communicated by means of scaled representation, a decision may be made in good time by the user as to whether a data storage medium should be replaced with a more suitable data storage medium or whether the data signal recorded on a data storage medium should be copied to a more suitable data storage medium or whether transmission parameters for a transmission link should be modified.

The invention will be further described with reference to two examples of embodiments shown in the drawings, to which, however, the invention is not restricted.

Figure 1:
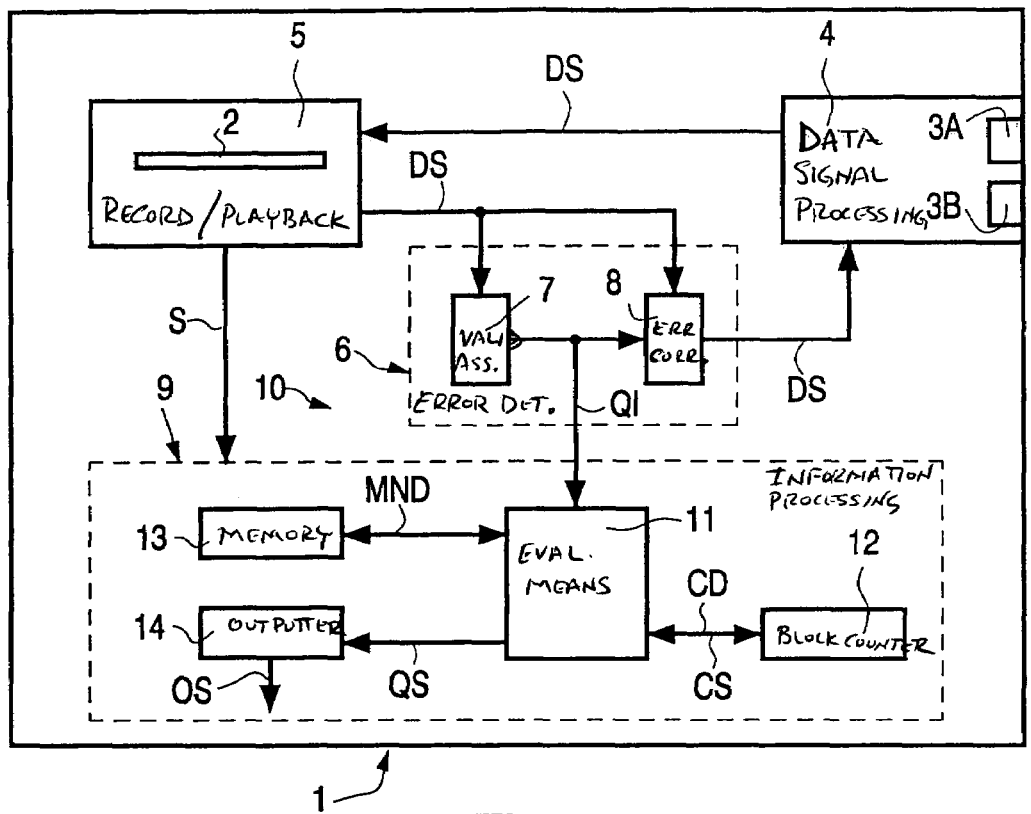
FIG. 1 is a schematic representation, in the form of a block diagram, of a data processing device according to a first example of embodiment of the invention.

FIG. 1 shows a data processing device 1 designed to process a data signal DS, wherein the data signal DS represents a video signal. The data processing device 1 takes the form of a hard disk video recorder. Accordingly, the data processing device 1 is designed to record the data signal DS on a data storage medium 2 and to play back the data signal DS from the data storage medium 2, wherein the data storage medium 2 takes the form of a hard disk.

The data processing device 1 comprises video signal receiving means 3a and video signal output means 3b and data signal processing means 4. The video signal may be fed from an aerial (not shown in FIG. 1) to the data processing device 1 or the data signal processing means 4 by means of the video signal receiving means 3a. The video signal may be sent to a television set (not shown in FIG. 1) by the data processing device 1 or the data signal processing means 4 by means of the video signal output means 3b.

The data signal processing means 4 are designed to process the received video signal, wherein the data signal DS may be generated and output for the purposes of recording by the data signal processing means 4. To this end, the data signal processing means 4 are designed for MPEG coding of the received video signal and for preparing the data signal DS for recording on the data storage medium 2. The data signal processing means 4 are additionally designed to receive a data signal DS played back by the data storage medium 2 and to generate and, by means of the video signal output means 3b, to output a video signal generatable from the played-back data signal DS.

The data signal DS prepared for recording on the data storage medium 2 and played back by the data storage medium 2 comprises data blocks. Each data block is at least two dimensional in structure and comprises at least two data zones. Each data zone takes the form of a so-called data sector, as is conventional in recording the data signal DS on a data storage medium 2 in the form of a hard disk. Each data sector comprises sector data. The first dimension of the data block in the present case takes the form of the data sectors forming the data zones.

In the present case, each data block comprises sixty-four (64) data sectors, which each consist of five hundred and twelve (512) bytes. Of the altogether sixty-four (64) data sectors, only fifty-eight (58) data sectors are provided for useful data, wherein the useful data represent the information content of the video signal. The fifty-eight (58) data sectors comprising useful data comprise useful test data in addition to the useful data, wherein errors in the useful data may be detected by means of the useful test data.

The remaining six (6) data sectors of each data block comprise correction data and correction test data in addition to the correction data, wherein errors in the correction data may be detected by means of the correction test data. The sector data of the respective data sector may be corrected by means of the correction data. The correction data are encoded in accordance with the "Reed-Solomon code RS (64, 58)"—known sufficiently well to a person skilled in the art—over the "finite field $GF(2^8)$". According to the RS (64, 58) encoding, in the present case the sector data from at most six (6) data sectors may be corrected by means of the correction data of a data block. Accordingly, in the present case the number of six (6) data sectors constitutes a limit value for erroneous data sectors, for which limit value it is technically ensured that the total data signal DS may be processed without loss and in real time.

The second dimension of the data block consists in the present case of RS (64, 58) code words, wherein each of these code words is formed by means of in each case one byte from in each case one of the fifty-eight (58) data sectors comprising useful data and by means of in each case one byte of the six (6) data sectors comprising correction data. In the present case, the bytes in each case forming one code word are located at identical byte positions within the sixty-four (64) data sectors. Accordingly, each data block is two-dimensional in structure. In specialist circles, such a two-dimensionally structured data block is understood as two-dimensional error correction coding, or ECC.

However, it should be mentioned that the bytes in each case forming the RS code word may be located at non-identical byte positions within the sixty-four (64) data sectors. Such code words are well known in specialist circles as scrambled or interleaved code words, wherein these are understood to include a 2.5-dimensional or even 3-dimensional error correction coding, i.e. a 2.5-dimensional or even 3-dimensional data block structure, depending on the degree of scrambling or interleaving. However, the data blocks may be structured with an even larger number of dimensions. It should also be mentioned, in conjunction with the data blocks, that each data block may comprise a number of data zones deviating from that indicated herein. Moreover, the number of bytes per data zone may in principle differ from five hundred and twelve (512). Furthermore, a coding deviating from the RS (64, 58) coding may be selected for the correction data, such that a limit value deviating from the number of six (6) data zones in accordance with the respective deviating coding may be obtained.

The data processing device 1 further comprises a record/playback device 5, which is designed to receive the data signal DS prepared by the data signal processing means 4 and to record the data signal DS on the data storage medium 2 and to play back the recorded data signal DS from the data storage medium 2 and to output this played-back data signal DS. The record/playback device 5 is additionally designed to discharge the data storage medium 2 and to accept the data storage medium 2, such that the data storage medium 2 may be exchanged. In this context, the record/playback device 5 is designed, during exchange of the data storage medium 2, to generate and output an initialization signal S as soon as the data storage medium 2 has been fully accepted thereby and is available for recording the data signal DS.

The data processing device 1 further comprises error detection/correction means 6, which are accommodated between the record/playback device 5 and the data signal processing means 4 and which are designed to receive the data signal DS played back by the data storage medium 2 and to detect errors in the sector data of the data signal DS and to correct the detected errors and to send the error-free data signal DS to the data signal processing means 4. To this end, the error detection/correction means 6 comprise validity assessment means 7 and an error correction stage 8, wherein the validity assessment means 7 and the error correction stage 8 are designed to receive the played-back data signal DS. The validity assessment means 7 are designed to assess whether data zones, i.e. data sectors of at least one data block, are valid or invalid and to generate and output validity information QI representing the assessment result to the error correction stage 8.

The validity information QI comprises the information required by the error correction stage 8, by means of which information correction of the erroneous data sectors of a data block may be performed by the error correction stage 8 by means of the correction data of the respective data block. In the present case, the error detection/correction means 6 comprise a conventional two-stage structure. Accordingly, the validity assessment means 7 takes the form of a conventional sector data error detection stage, which assesses a data sector as invalid as soon as a single error is detected within that data sector and, by means of the validity information QI, sends the position of the data sector assessed as invalid to the error correction stage 8 as the information required to correct the erroneous data sector. However, it may be mentioned that assessing whether data sectors of a data block are valid or invalid may also be dependent on more than a single error.

The error correction stage 8 is designed to receive the validity information QI and, on the basis of the received validity information QI, to correct the erroneous sector data of a data sector assessed as invalid of a data block. The error correction stage 8 is further designed, optionally after correction of the erroneous sector data, to output the played-back data signal DS comprising error-free sector data.

According to the invention, the data processing device 1 comprises validity information processing means 9, which are designed to receive the validity information QI and which are designed to determine the quality of the data signal DS on the basis of the validity information QI. The validity assessment means 7 and the validity information processing means 9 form determination means 10 for determining the quality of the data signal DS. To this end, the validity information processing means 9 comprise evaluation means 11, block counting means 12, memory means 13 and output means 14, which means 11, 12, 13 and 14 will be examined in more detail below.

The block counting means 12 are provided to count the number of data blocks of the played-back data signal DS. To this end, the block counting means 12 are designed to receive a block count signal CS and, as a consequence of reception of the block count signal CS, to increase a block count by the value 1. The block counting means 12 are additionally designed, by means of block count data CD, to represent the block count and to output the block count data CD.

The memory means 13 are provided to store maximum number data MND, which maximum number data MND represent the maximum number arising of invalid data zones of a data block.

The validity information processing means 9 are designed to determine the quality of the data signal DS on the basis of the number of invalid data zones of at least one data block determinable by means of the validity information QI, wherein in the present case each data block is used to determine the quality of the data signal. To this end, the evaluation means 11 are designed to receive the validity information QI and to evaluate the received validity information QI with regard to the number of invalid data zones of a data block. In the present case, the evaluation means 11 are designed to evaluate the validity information QI with regard to the number of erroneous data sectors of a data block, which data sectors comprise at least a single error in the respective sector data. The evaluation means 11 are additionally designed to generate number data representing the number of erroneous data sectors of a data block and to compare these number data with the maximum number data MND stored in the memory means 13. If the number data represent a number of erroneous data sectors of a data block which is greater than the number represented by means of the maximum number data MND, the evaluation means 11 are designed to send the number data to the memory means 13 as new maximum number data MND, in order to store these new maximum number data MND by means of the memory means 13.

The validity information processing means 9 are further designed to determine the quality of the data signal DS in relation to the limit value of invalid data zones of each data block. To this end, the evaluation means 11 are designed, after each comparison of the number data with the maximum number data MND, to generate a quality indicating signal QS, wherein, if the maximum number data MND represent the number one (1) or two (2), the quality indicating signal QS representing good quality may be generated and wherein, if the maximum number data MND represent the number three (3) or four (4) or five (5), the quality indicating signal QS representing average quality may be generated and wherein, if the maximum number data MND represent the number six (6), the quality indicating signal QS representing poor quality may be generated. Accordingly, in the present case the quality indicating signal QS represents three quality classes of the data signal DS. It should be mentioned at this point that another number of quality classes may also be provided as a function of the respective field of use of the determination means 10.

The output means 14 are designed to receive the quality indicating signal QS and to output the quality indicating signal QS representing the determined quality of the data signal DS as a scalar optical signal. The output means 14 comprise three light-emitting diodes, not illustrated in FIG. 1, for outputting the quality indicating signal QS in the form of an optical signal, namely a green light-emitting diode and a yellow light-emitting diode and a red light-emitting diode. The output means 14 are further designed to decode the quality class represented by means of the quality indicating signal QS and, as a function of the decoded quality class, to switch on, i.e. to supply with electrical power, one of the three light-emitting diodes. If the quality indicating signal QS represents good quality, the output means 14 are designed to switch on the green light-emitting diode. If the quality indicating signal QS represents average quality, the output means 14 are designed to switch on the yellow light-emitting diode. If the quality indicating signal QS represents poor quality, the output means 14 are designed to switch on the red light-emitting diode. Accordingly, the validity information processing means 9 are designed to output the quality indicating signal QS representing the determined quality of the data signal DS. It may be mentioned that the output means 14 may comprise a single light-emitting diode, namely a red light-emitting diode, for outputting the quality indicating signal QS representing poor quality. It should additionally be mentioned that a three-color light-emitting diode may also be provided for outputting the three quality classes.

In the present case, for reasons of significance the evaluation means 11 are designed to output the quality indicating signal QS only after playback of the first fifty (50) data blocks of the recorded data signal DS. To this end, the block count signal CS may be sent by the evaluation means 11 to the block counting means 12 after each evaluation of the validity information QI with regard to the number of erroneous data sectors of a data block, which block count signal CS causes an increase in the block count by the value of one (1) at the block counting means 12. The evaluation means 11 are additionally designed to access the block count data (CD) and to compare the block count data CD representing the number of data blocks with the number fifty (50) and, as soon as the block count data CD represent the number fifty (50), to output the quality indicating signal QS. Once the block count data CD represent the number fifty (50), the evaluation means 11 are designed to suppress the block count signal CS, such that the block count is not increased any further. It should be mentioned at this point that any other number of data blocks may also be used. Likewise, the validity information processing means 9 may be such that they do not comprise any block counting means 12 and that the evaluation means 11 may be designed for immediate generation and output of the quality indicating signal QS.

The validity information processing means 9 are additionally designed to receive the initialization signal S, wherein the validity information processing means 9 may be set at an initial state as a consequence of reception of the initialization signal S, in which initial state the validity information processing means 9 are paused until the validity information QI is fed to them by the validity processing means 7, which validity information QI represents the assessment result of the assessment of the first data block of the played-back data signal DS. In the initial state, the memory means 13 exhibit maximum number data MND which represent the value zero (0). Furthermore, in the initial state the block counting means 12 represent count data CD, which represent the number zero (0). In addition, none of the three light-emitting diodes of the output means 14 is switched on in the initial state, and indeed none of the three light-emitting diodes is switched on until the first fifty (50) data blocks of the data signal DS have been played back. The evaluation means 11 are designed, in the initial state, to suppress output of the quality indicating signal QS and to wait for first reception of the validity information QI, which validity information QI represents the assessment result of the assessment of the first data block of the played-back data signal DS.

In the present case, the determination means 10 of the data processing device 1 take the form of hardware, such that the limit value is preset by the number of six (6) invalid data zones of a data block of the data stream DS. However, it should be mentioned that the determination means 10 may also take the form of software and that, for example, the data storage medium 2 may contain information about the Reed-Solomon coding or any other coding present in each case, such that determination of the quality of the data signal DS may be performed relative to a limit value dependent on the coding selected in each case. It may be mentioned that the limit value may additionally be dependent on the material of a recording medium of the data storage medium.

In the following, the mode of operation of the data processing device 1 is explained with reference to an example of application of the data processing device 1 according to FIG. 1, wherein the determination method according to the invention is performed, namely: assessment of whether data zones of at least one data block are valid or invalid, and generation and outputting of validity information QI representing the assessment result and determination of the quality of the data signal DS on the basis of the validity information QI, wherein in the present case data zones of each data block are assessed.

According to this example of application, it should first of all be assumed that the data signal DS stored on the data storage medium 2 represents a video film in the form of a video signal and the data storage medium 2 exhibits slight contamination, such that at most two data sectors per data block exhibit erroneous sector data. The data storage medium 2 is inserted by a user of the data processing device 1 into the record/playback device 5 for the purpose of playing back the data signal DS, whereupon the initialization signal S is output by the record/playback device 5 to the validity information processing means 9 and the latter are thereby directed into the initial state until start of playback of the data signal DS.

After insertion of the data storage medium into the record/playback device 5, the user starts playback of the data signal DS with start means not shown in FIG. 1. Then, data blocks constituting the played-back data signal DS are sent by the record/playback device 5 to the error detection/correction means 6 and there fed to the validity assessment means 7 and the error correction stage 8. The validity assessment means 7 assesses as invalid those data sectors of a data block which exhibit at least one error in the sector data. The validity assessment means 7 generate the validity information QI and send it to the error correction stage 8, whereupon the error correction means 8 effect correction in the conventional manner of the erroneous sector data on the basis of the validity information QI, such that erroneous data blocks forming the data signal DS are sent by the error detection/correction means 6 to the data signal processing means 4.

Starting with the first data block of the data signal DS, the validity information processing means 9 effect determination of the quality of the data signal DS by the determination method according to the invention on the basis of the number of invalid data zones determinable by means of the validity information QI, wherein firstly, by means of the evaluation means 11, the validity information QI is evaluated with regard to the number of invalid data sectors in the individual data blocks. Number data are formed as a result of the evaluation, which data represent the number of invalid data sectors in a data block. These number data are compared by means of the evaluation means 11 with maximum number data MND stored in the memory means 13 and, if the number data represent a number which is greater than the number represented by means of the maximum number data MND, are output as new maximum number data MND to the memory means 13 and stored thereby. This always occurs after the start of playback of the data signal DS if a data block contains at least one data sector exhibiting erroneous sector data. In the present case, it should be assumed that the tenth (10th) data block alone exhibits two (2) invalid data sectors and that all the sector data of the remaining data blocks of the data signal DS are error-free, such that, after reception of the validity information QI indicating the invalid data zones of the tenth (10th) data block and after evaluation of this validity information QI, maximum number data MND representing the number two (2) are output to the memory means 13 and stored there.

Moreover, in the validity information processing means 9, the quality of the data signal DS is determined by the determination method according to the invention in relation to the limit value of invalid data zones of each data block. To this end, the block count signal CS is output to the block counting means 12 by means of the evaluation means 11 each time evaluation of the validity information QI is terminated, whereby the block count is increased by the value one (1) in the block counting means 12. The block count data CD representing the block count is then read out from the block counting means 12 by means of the evaluation means 11 and the value represented by means of the count data CD is compared with the value fifty (50). As soon as block count data CD representing a value greater than fifty (50) have been read out from the block counting means 12 by means of the evaluation means 11, the quality indicating signal QS is generated by the evaluation means 11 and output to the output means 14, which quality indicating signal QS in the present case represents a good quality data signal DS, because the maximum number data MND represent the number two (2). Since it was assumed in the present case that the data signal DS recorded on the data storage medium 2 exhibits only data blocks which contain no more than two erroneous sector data per data block, the green light-emitting diode is switched on by the output means 14 throughout the period of playback of the data signal DS. Accordingly, in the validity information processing means 9, the quality indicating signal QS representing the determined quality of the data signal DS is generated by the determination method according to the invention and output as the optical signal.

It is thus wholly obvious to the user of the data processing device 1 that the data signal DS played back by the data storage medium 2 is of good quality and that consequently the data storage medium 2 exhibits only negligible damage or contamination.

It should be assumed below that, over a relatively long period of time, the user repeatedly removes the data storage medium 2 from the record/playback device 5, stores it temporarily and re-inserts it into the record/playback device 5. Through frequent, repeated removal, temporary storage and re-insertion into the record/playback device 5, the data storage medium 2 is lastingly contaminated, since this handling of the data storage medium generally takes place in an environment, such as for example a living room, in which dust contamination cannot in practice be ruled out. As a consequence of contamination of the data storage medium 2, it should be assumed that the one hundredth (100th) data block of the data signal DS recorded on the data storage medium 2 contains six (6) data sectors comprising erroneous sector data and that the remaining data blocks contain fewer than six data sectors exhibiting erroneous sector data. Therefore, during assessment of the data zones of the one-hundredth (100th) data block, the validity information QI is generated by the validity assessment means 7, on the basis of which number data are generated by means of the evaluation means 11 during evaluation of this validity information QI with regard to the number of invalid data zones in this data block, which number data represent the number six (6). Since evaluation of the validity information QI of the preceding data blocks has not produced any greater number than the number six (6), the number data are stored as new maximum number data MND in the memory means 13. Moreover, the evaluation means 11 generate the quality indicating signal QS, which represents poor quality of the data signal DS. In the output means 14, this quality indicating signal QS is decoded and the red light-emitting diode is switched on in accordance with the poor quality of the data signal DS represented by means of the quality indicating signal QS. For the user, the presence of a red light-emitting diode is an unambiguous and unequivocal indication that the data signal DS played back by the data storage medium 2 is of poor quality and consequently the data storage medium 2 also exhibits contamination or damage which can no longer be deemed negligible. The red light-emitting diode unambiguously informs the user of the fact that there is a probability that it will in the foreseeable future no longer be possible to ensure undisturbed enjoyment of the video. This is the case in particular because total loss of the data signal DS caused by a number of invalid data zones of a data block exceeding the limit value may occur due to further contamination of or further damage to the data storage medium 2. The advantage is consequently achieved that the user is informed in good time of the fact that he/she needs to copy the data signal DS recorded on the data storage medium 2 to a new, above all clean and undamaged data storage medium, in order to ensure the continued existence of the data signal DS.

It may be mentioned that counting of the data blocks is not terminated after fifty (50) data blocks have been counted and that the counted number of data blocks is used to indicate the meaningfulness of the determined quality of the data signal DS in relation to a total number of data blocks of the data signal DS.

It may additionally be mentioned that the data storage medium 2 may also take the form of a rewritable "Digital Versatile Disk" or DVD or of a Compact Disk or CD.

It may additionally be mentioned that, in the event of insertion of the data storage medium 2 into the record/playback device 5, automatic determination of the quality of the data signal DS may also be provided for problem zones of the data storage medium 2 caused by contamination or damage. Such problem zones are, for example in the case of a Compact Disk, those areas in which the Compact Disk has been preferentially gripped by a user.

Figure 2:
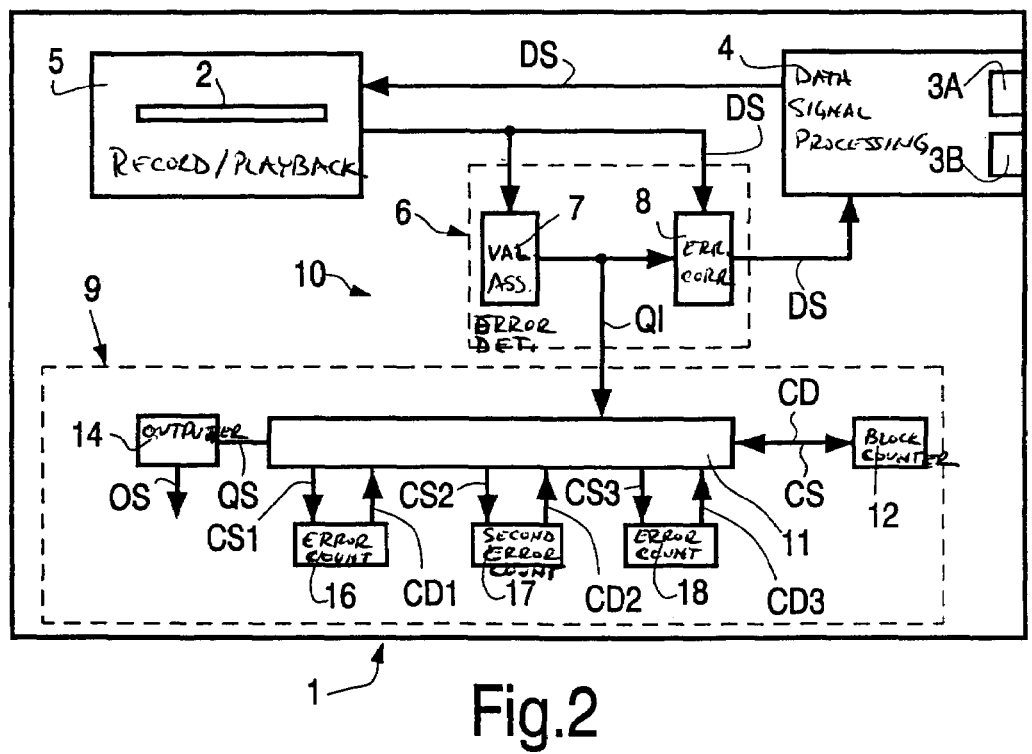
FIG. 2 is a schematic representation, in the form of a block diagram, of a data processing device according to a second example of embodiment of the invention.

The data processing device 1 illustrated in FIG. 2 constitutes a component of a video camera (not shown in FIG. 2) for professional use outside a studio. For this reason, the record/playback device 5 is not designed for exchange of the data storage medium 2, so as to avoid inevitable contamination of the video camera or the data storage medium 2 when used outside the studio. Consequently, in the case of the data processing device 1, the primary cause of expected impairment of the quality of the data signal DS recorded on the data storage medium 2 is excessive vibrations during recording of the data signal DS on the data storage medium 2. Consequently, in the case of the data processing device 1 illustrated in FIG. 2, no initialization signal S is provided, in comparison with the data processing device 1 illustrated in FIG. 1. In the present case, the data storage medium 2 takes the form of a hard disk designed for magnetic recording and playback of the data signal DS. Consequently, in the case of such a data storage medium 2, the record/playback device 5 is also designed to record and play back the data signal DS.

In contrast to the data processing device 1 illustrated in FIG. 1, the validity information processing means 9 illustrated in FIG. 2 comprise first error counting means 16, second error counting means 17 and third error counting means 18, which means 16, 17 and 18 will be examined in more detail below.

The first error counting means 16 are provided for counting the number of data blocks, which data blocks comprise one invalid data block or two invalid data zones and by definition constitute a part of the data signal DS which is of good quality. To this end, the first error counting means 16 are designed to receive a first error count signal CS1 and, as a consequence of reception of the first error count signal CS1, to increase a first error count by the value one (1), which first error count is represented by means of first error count data CD1, and to output the first error count data CD1.

The second error counting means 17 are provided for counting the number of data blocks, which data blocks comprise three or four invalid data zones and by definition constitute a part of the data signal DS which is of average quality. To this end, the second error counting means 17 are designed to receive a second error count signal CS2 and, as a consequence of reception of the second error count signal CS2, to increase a second error count by the value one (1), which second error count is represented by means of second error count data CD2, and to output the second error count data CD2.

The third error counting means 18 are provided for counting the number of data blocks, which data blocks comprise five or six invalid data zones and by definition constitute a part of the data signal DS which exhibits poor quality, because technically reliable correction of the invalid data zones is ensured only up to a maximum of six invalid data zones per data block. For the purpose of counting, the third error counting means are designed to receive a third error count signal CS3 and, as a consequence of reception of the third error count signal CS3, to increase a third error count by the value one (1), which third error count is represented by means of third error count data CD3, and to output the third error count data CD3.

In the present case, the evaluation means 11 are designed to generate the respective error count signal CS1 or CS2 or CS3 as a consequence of evaluation of the validity information QI with regard to the number of invalid data zones of a data block and as a function of the number of invalid data zones and to send it to the respective error counting means 16 or 17 or 18. The evaluation means 11 are additionally designed to receive the three items of error count data CD1, CD2 and CD3. The evaluation means 11 are additionally designed to generate and output the quality indicating signal QS on the basis of the received count data CD1, CD2 and CD3. In analogy to the data processing device 1 illustrated in FIG. 1, in the present case too the quality indicating signal QS generated by means of the data processing device 1 illustrated in FIG. 2 represents three quality classes of data signal DS, namely in the present case good quality if data blocks with at most two (2) invalid data zones are present or average quality if data blocks with at most four (4) invalid data zones are present or poor quality if data blocks with at most six (6) invalid data zones are present. In addition to the three quality classes, the quality indicating signal QS in the present case also represents the frequency, represented by means of the three items of count data CD1, CD2 and CD3, of invalid data zones for the respective quality class.

The output means 14 comprise display means, not shown in FIG. 2, which in the present case take the form of a conventional LCD display device, which LCD display device is designed to display alphanumeric character strings and to display a bar chart consisting of three bars. The output means 14 are designed, on reception of the quality indicating signal QS indicating poor quality, to generate a first alphanumeric character string, which contains the wording: "The recording is of poor quality" and, on reception of the quality indicating signal QS indicating average quality, to generate a second alphanumeric character string with the wording: "The recording is of average quality" and, on reception of the quality indicating signal QS indicating good quality, to generate a third alphanumeric character string with the wording: "The recording is of good quality" and to send the respective alphanumeric character string to the LCD display device. The output means 14 are further designed to generate, as a function of the received quality indicating signal QS, a bar chart consisting of three bars by means of the LCD display device, wherein a first bar represents the first count data CD1 and wherein a second bar represents the second count data CD2 and wherein a third bar represents the third count data CD3. The output means 14 are additionally designed, in the event of a poor quality data signal DS, to generate additional alphanumeric information for the user which is worded "The last shot must be repeated". The advantage is thus achieved that a clear indication of the quality of the data signal DS recorded on the data storage medium 2 resulting from disadvantageous operating conditions, as may occur for example as a consequence of shaking or vibrations during recording of the data signal DS on the data storage medium 2, may be communicated to the user of the data processing device 1 upon playback of the data signal DS.

It may be mentioned that the counted number of data blocks may be used to indicate the relative frequency of invalid data zones for the respective quality class.

It may be mentioned that it is not essential to assess every data zone during assessment of the validity of the data zones of a data block. It is possible, in this connection, to provide for, say, only every second data zone of a data block to be assessed. Likewise, assessment of the data zones may for example be performed in a random pattern.

It may additionally be mentioned that it is not essential to use every data block in determining the quality of the data signal DS, but rather for example to use only every sixteenth (16th) data block or every thirty-second (32nd) data block out of sixty-four (64) data blocks.

It may additionally be mentioned that the data signal DS may also originate from a server which functions as a data source and comprises the determination means 10.

It may be mentioned that, in the case of radio transmission of the data signal DS, a receiver of the data signal DS may be provided with the determination means 10.

It may additionally be mentioned that the data signal DS may represent our audio signal or a combination of a video signal and an audio signal or the like.

The invention claimed is:

1. Determination means (10) for determining the quality of a data signal (DS), which data signal (DS) consists of data blocks, wherein each data block is at least two-dimensional in structure and comprises at least two data zones, said determination means (10) comprising:
   validity assessment means (7), which assess whether data zones of at least one data block are valid or invalid, and to generate and output validity information (QI) representing the assessment result, said output validity information including information regarding a position of the data zone within the data block assessed as valid or invalid, and
   validity information processing means (9) to determine the quality of the data signal (DS) on the basis of the validity information (QI).

2. Determination means (10) as claimed in claim 1, wherein the validity information processing means (9) determine the quality of the data signal (DS) on the basis of the number of invalid data zones of at least one data block determinable the validity information (QI).

3. Determination means (10) as claimed in claim 1, wherein the validity information processing means (9) determine the quality of the data signal (DS) in relation to a limit value of invalid data zones of at least one data block.

4. Determination means (10) as claimed in claim 1, wherein the validity information processing means (9) output a quality indicating signal (QS) representing the determined quality of the data signal (DS).

5. A determination method for determining the quality of a data signal (DS), which data signal (DS) consists of data blocks, each data block being at least two-dimensional in structure and comprising at least two data zones, said determination method comprising:
   assessing whether data zones of at least one data block are valid or invalid, and generating and outputting validity information (QI) representing the assessment result, said output validity information including information regarding a position of the data zone within the data block assessed as valid or invalid, wherein the quality of the data signal (DS) is determined on the basis of the validity information (QI).

6. A determination method as claimed in claim 5, wherein the quality of the data signal (DS) is determined on the basis of the number of invalid data zones of at least one data block determinable by means of the validity information (QI).

7. A determination method as claimed in claim 5, wherein the quality of the data signal (DS) is determined in relation to a limit value of invalid data zones of at least one data block.

8. A determination method as claimed in claim 5, a quality indicating signal (QS) representing the determined quality of the data signal (DS) is output.

9. A data processing device (1) for processing a data signal (DS) having determination means (10) for determining the quality of a data signal (DS), which data signal (DS) consists of data blocks, wherein each data block is at least two-dimensional in structure and comprises at least two data zones, said determination means (10) comprise:
   validity assessment means (7), to assess whether data zones of at least one data block are valid or invalid, and to generate and output validity information (QI) representing the assessment result, said output validity information including information regarding a position of the data zone within the data block assessed as valid or invalid, and
   validity information processing means (9) to determine the quality of the data signal (DS) on the basis of the validity information (QI).

10. A data processing device (1) as claimed in claim 9, wherein the validity information processing means (9) determine the quality of the data signal (DS) on the basis of the number of invalid data zones of at least one data block determinable by means of the validity information (QI).

11. A data processing device (1) as claimed in claim 9, wherein the validity information processing means (9) determine the quality of the data signal (DS) in relation to a limit value of invalid data zones of at least one data block.

12. A data processing device (1) as claimed in claim 9, wherein the validity information processing means (9) output a quality indicating signal (QS) representing the determined quality of the data signal (DS).

* * * * *